United States Patent
Chen et al.

(10) Patent No.: US 9,019,727 B2
(45) Date of Patent: Apr. 28, 2015

(54) TEMPERATURE COMPENSATION OF OUTPUT DIODE IN AN ISOLATED FLYBACK CONVERTER

(75) Inventors: Min Chen, Milpitas, CA (US); John David Morris, Sunnyvale, CA (US); Michael George Negrete, Mountain View, CA (US)

(73) Assignee: Linear Technology Corporation, Milpitas, CA (US)

( * ) Notice: Subject to any disclaimer, the term of this patent is extended or adjusted under 35 U.S.C. 154(b) by 344 days.

(21) Appl. No.: 13/552,360

(22) Filed: Jul. 18, 2012

(65) Prior Publication Data

US 2014/0022823 A1    Jan. 23, 2014

(51) Int. Cl.
*H02M 3/335* (2006.01)
*H02M 3/156* (2006.01)

(52) U.S. Cl.
CPC .............. *H02M 3/156* (2013.01); *H02M 3/335* (2013.01)

(58) Field of Classification Search
None
See application file for complete search history.

(56) References Cited

U.S. PATENT DOCUMENTS

| 4,633,165 | A | | 12/1986 | Pietkiewicz et al. |
| 5,442,534 | A | * | 8/1995 | Cuk et al. ................. 363/16 |
| 5,999,417 | A | * | 12/1999 | Schlecht ................... 363/16 |
| 6,127,815 | A | * | 10/2000 | Wilcox ..................... 323/282 |
| 2002/0136034 | A1 | * | 9/2002 | Feldtkeller .............. 363/21.01 |
| 2011/0018609 | A1 | * | 1/2011 | Chou et al. .............. 327/513 |
| 2012/0218026 | A1 | * | 8/2012 | Nadimpalli et al. ...... 327/513 |

* cited by examiner

*Primary Examiner* — Timothy J Dole
*Assistant Examiner* — Monica Mata
(74) *Attorney, Agent, or Firm* — Patent Law Group LLP; Brian D. Ogonowsky

(57) ABSTRACT

An isolated flyback converter having temperature compensation (TC) uses primary side sensing and an output diode, the output diode having a variable voltage drop related to its temperature. A feedback voltage $V_{FB}$, proportional to the output voltage $V_{OUT}$, in a feedback loop is compared to a fixed reference voltage $V_{REF}$ for setting a duty cycle of a power switch, wherein $V_{FB}$ is caused to approximately equal $V_{REF}$. A TC circuit has a voltage source configured to generate a proportional-to-absolute-temperature voltage $V_{PTAT}$, wherein $V_{PTAT}$ is at approximately $V_{REF}$ at a calibration temperature $T_0$ and rises as a temperature exceeds $T_0$. The voltage source is connected to the $V_{FB}$ node via a TC resistor $R_{TC}$, so that at $T_0$ no current flows through $R_{TC}$. Therefore, the selection of the optimal $R_{TC}$ does not affect the selection of a scaling resistance for generating $V_{FB}$. The current through $R_{TC}$ at elevated temperatures compensates $V_{OUT}$.

19 Claims, 6 Drawing Sheets

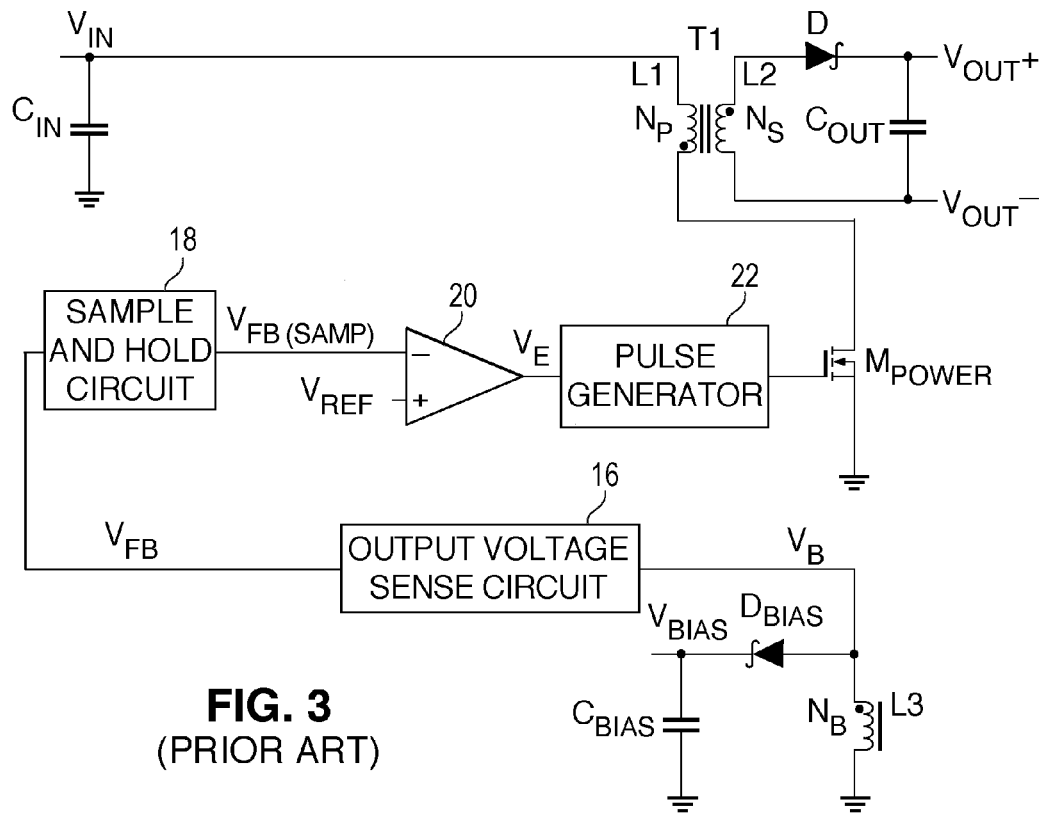
FIG. 3
(PRIOR ART)
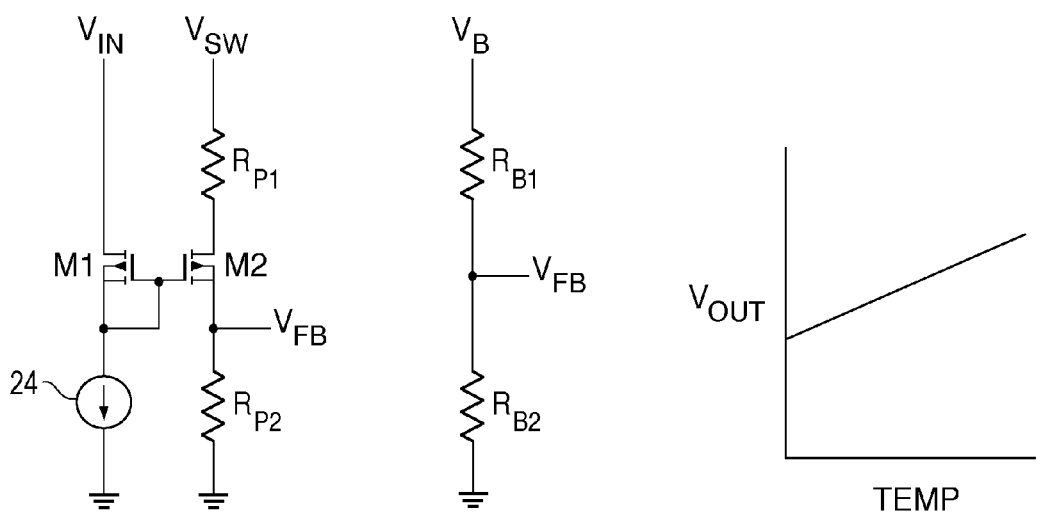
FIG. 4
(PRIOR ART)
FIG. 5
(PRIOR ART)
FIG. 6
(PRIOR ART)

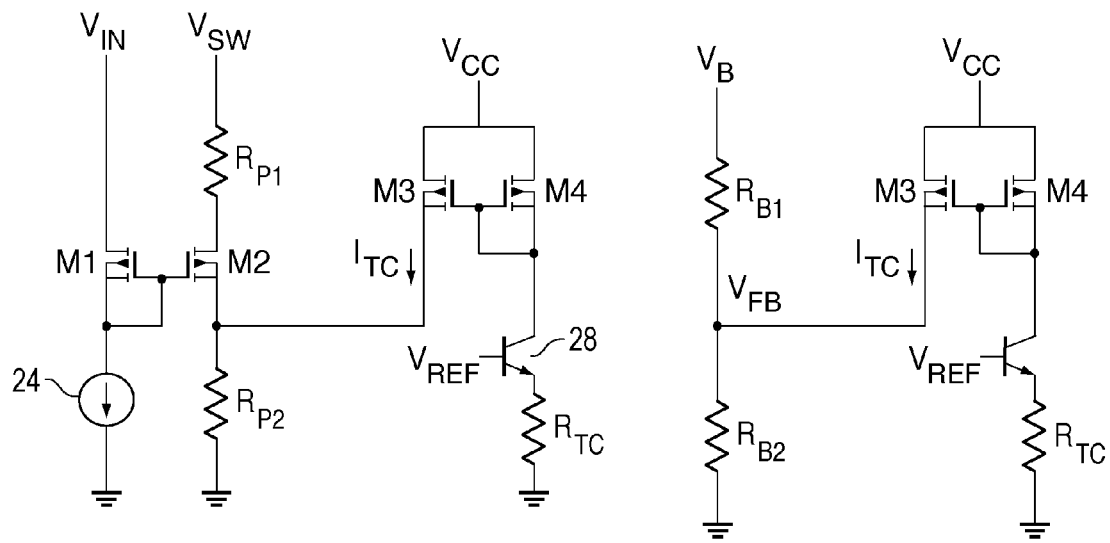
FIG. 7
(PRIOR ART)
FIG. 8
(PRIOR ART)
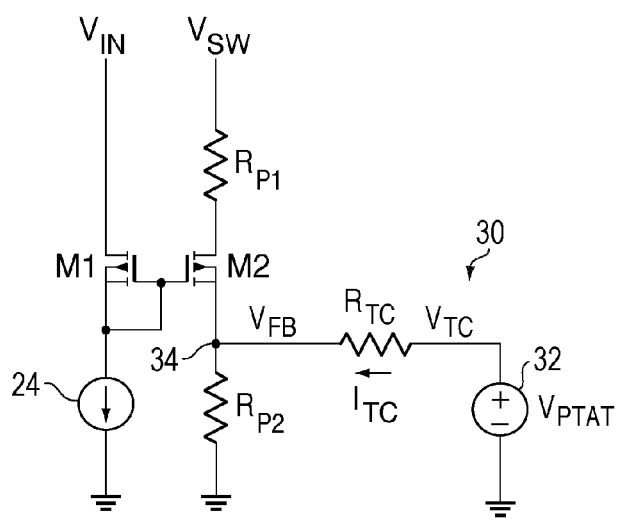
FIG. 9

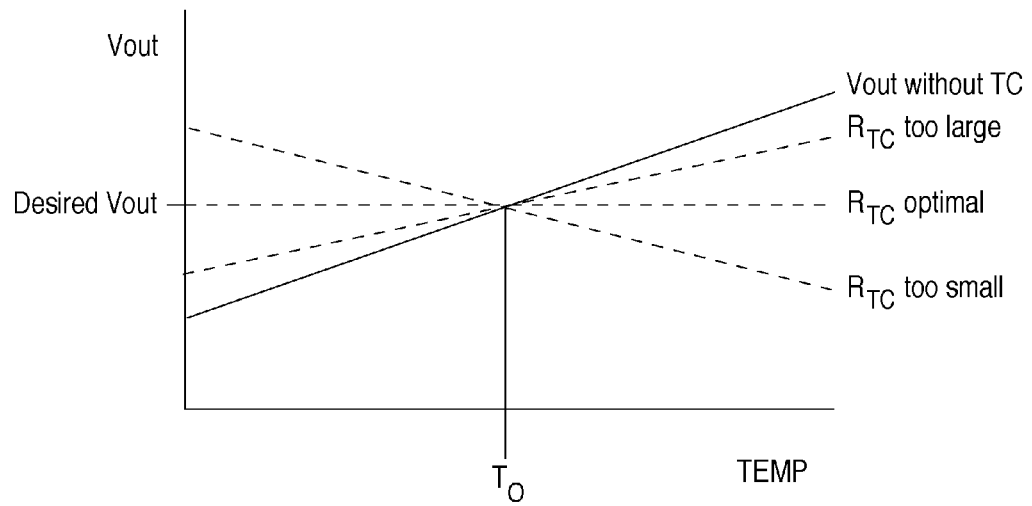
FIG. 10
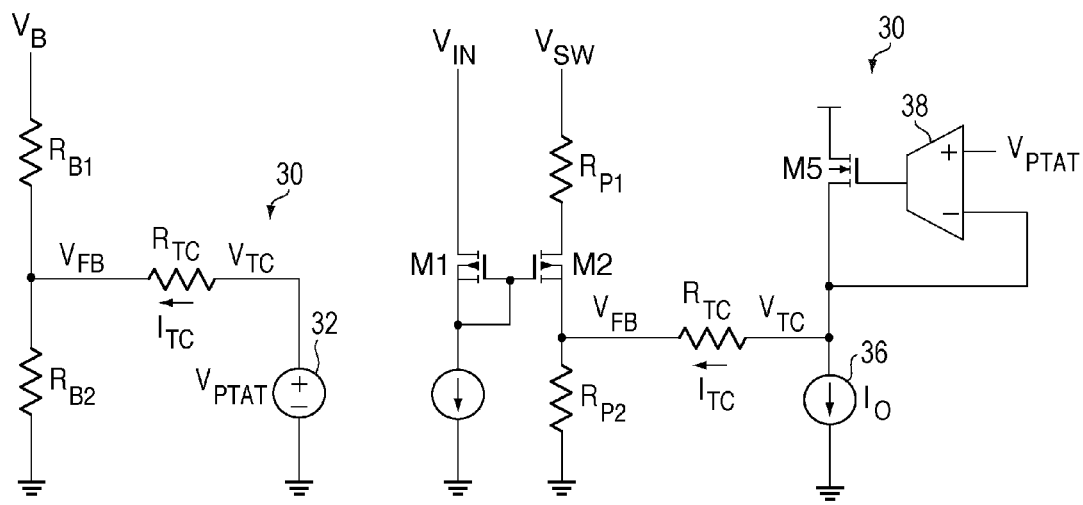
FIG. 11  FIG. 12

TEMPERATURE COMPENSATION OF OUTPUT DIODE IN AN ISOLATED FLYBACK CONVERTER

FIELD OF THE INVENTION

This invention relates to DC-DC flyback converters and, in particular, to a temperature compensation technique for an isolated flyback converter, where the converter uses an output diode and primary side sensing to detect an output voltage.

BACKGROUND

DC-DC flyback converters are well known. When isolation between the input and output stage is required, the output voltage can be sensed by various methods for providing feedback. One way to convey the output voltage to the primary side while maintaining isolation is to use an optocoupler. However, using an optocoupler requires additional circuitry, space, power, and cost. A more elegant way of detecting the output voltage is to sense a voltage at a terminal of the power switch when the power switch is turned off during the discharge (or flyback) cycle of the converter. Such a sensed voltage is related in a known manner to the output voltage.

FIG. 1 illustrates one type of flyback converter which detects the output voltage $V_{OUT}$ by detecting the voltage at the primary winding L1 of the transformer T1 when the power switch MOSFET $M_{POWER}$ is turned off during the discharge (or flyback) cycle. Sensing an output voltage by a signal at the primary side of a transformer is sometimes referred to as primary side sensing.

The MOSFET $M_{POWER}$ is controlled by an output regulation and control circuit 14 to connect the primary winding L1 between the input voltage $V_{IN}$ (e.g., a battery voltage) and ground during a charging cycle.

To achieve a regulated $V_{OUT}$, the MOSFET $M_{POWER}$ is turned off after a controlled time, and the Schottky diode D becomes forward biased. A conventional pn diode may also be used. The current through the secondary winding L2 is transferred to the load and the smoothing capacitor $C_{OUT}$ at the required voltage.

For regulation feedback, the circuit 14 detects the voltage at the drain of MOSFET $M_{POWER}$ during the discharge cycle (MOSFET $M_{POWER}$ is off). The drain voltage is related to the winding ratio of L1 and L2, and the voltage across winding L2 is the output voltage Vout plus the voltage drop across the diode D. Such primary side sensing circuits for detecting $V_{OUT}$ are well known and need not be described in detail. The full data sheet for the Linear Technology LT3573 flyback converter, incorporated herein by reference and available online, describes the operation of the feedback circuit. This operation is also described in U.S. Pat. Nos. 7,471,522 and 7,463,497, assigned to the present assignee and incorporated herein by reference. Other known primary side voltage sensing techniques may be used.

The circuit 14 continues to control the duty cycle of the MOSFET $M_{POWER}$, at a variable frequency or a fixed frequency, to regulate $V_{OUT}$ based on the sensed voltage.

The output regulation and control circuit 14 may use any type of conventional technique to regulate, including current mode, voltage mode, or other modes.

In the example of FIG. 1, a voltage mode converter is shown. During a time when the MOSFET $M_{POWER}$ is off and when the diode D is conducting current, the switch voltage $V_{SW}$ at the drain of the MOSFET $M_{POWER}$ is sensed by an output voltage sense circuit 16. The circuit 16 includes a circuit that subtracts $V_{IN}$ from $V_{SW}$ (to obtain the voltage across the winding L1) then scales the voltage to generate a feedback voltage $V_{FB}$, wherein, when $V_{FB}$ equals a reference voltage $V_{REF}$, the output voltage $V_{OUT}$ is at the desired value, such as 5 volts. The circuit 16 generates $V_{FB}$ in accordance with the following equation:

$$V_{FB} = (V_{OUT} + V_F(T)) \cdot \frac{N_P}{N_S} \cdot Kp$$

where $V_F(T)$ is the forward voltage drop of diode D, $N_P/N_S$ is the turns ratio of L1 and L2, and Kp is a proportion defined by a resistor divider. The voltage drop across the diode D has a negative temperature coefficient and is about −2 mV/K. Since the converter adjusts the duty cycle of MOSFET $M_{POWER}$ to keep $V_{FB}$ equal to $V_{REF}$, the output voltage $V_{OUT}$ becomes higher than the desired voltage as the temperature rises.

At some point during the discharge phase, $V_{FB}$ is sampled by a sample and hold circuit 18, and the sampled $V_{FB}$ is applied to one input of an error amplifier 20. The error amplifier 20 compares $V_{FB}$ to a reference voltage $V_{REF}$ and outputs an error voltage $V_E$. A pulse generator 22 sets the duty cycle of the MOSFET $M_{POWER}$ to cause the error voltage $V_E$ to approximately equal zero. In this way the output voltage $V_{OUT}$ is regulated, albeit temperature dependent. The pulse generator 22 may include a current source that charges a capacitor based the value of $V_E$ to create a threshold voltage, a ramp generator, a PWM comparator that compares the threshold voltage to the ramp for setting the duty cycle, and drive circuitry for the MOSFET $M_{POWER}$. Such circuitry is conventional.

FIG. 2 illustrates the current through the primary winding L1, the current through the secondary winding L2, and the voltage $V_{SW}$ across the MOSFET $M_{POWER}$ for a particular duty cycle.

At time T1, the MOSFET $M_{POWER}$ turns on to charge the primary winding L1, causing a ramping current to flow in winding L1. The diode D is not conducting at this time.

After a variable or fixed time, at time T2, MOSFET $M_{POWER}$ shuts off and the diode D conducts. This ceases current in the primary winding L1 and causes the current through the secondary winding L2 to ramp down while charging the output capacitor $C_{OUT}$ and providing current to the load. The voltage across the MOSFET $M_{POWER}$ is related to the output voltage $V_{OUT}$ and is sampled during this time by the circuit 14.

At time T3, the secondary winding L2 current ramps down to zero and the diode D stops conducting to cause a discontinuous mode. For higher current loads, there may be no discontinuous operation while the duty cycle varies to regulate the output voltage.

After time T3, the parasitic capacitance of MOSFET $M_{POWER}$ and the inductance of winding L1 create an oscillating tank circuit.

At time T4, MOSFET $M_{POWER}$ turns on again, and the cycle repeats.

Additional detail of various converter circuits are described in U.S. Pat. Nos. 5,481,178; 6,127,815; 6,304,066; and 6,307,356, assigned to the present assignee and incorporated herein by reference.

FIG. 3 illustrates a conventional isolated flyback converter where the primary side sensing is implemented with a third winding L3, having $N_B$ turns, also referred to as a bias winding. During the discharge phase, a voltage will be generated across the third winding L3. The circuit formed of capacitor $C_{BIAS}$ and diode $D_{BIAS}$ limits spikes. The voltage $V_B$ is sensed by the output voltage sense circuit and scaled to generate the feedback voltage $V_{FB}$ in accordance with the following equation, previously described.

$$V_{FB} = (V_{OUT} + V_F(T)) \cdot \frac{N_B}{N_S} \cdot K_p$$

FIG. 4 illustrates a prior art circuit within the output voltage sense circuit 16 of FIG. 1 that subtracts the $V_{IN}$ voltage from the $V_{SW}$ voltage and scales down the voltage with resistors $R_{P1}$ and $R_{P2}$. The $V_{FB}$ voltage can be expressed as $$V_{FB} = (V_{OUT} + V_F(T)) \cdot \frac{N_P}{N_S} \cdot \frac{R_{P1}}{R_{P2}}$$

In FIG. 4, current source 24 draws a current through the p-channel MOSFET M1, having its source connected to $V_{IN}$. The p-channel MOSFETs M1 and M2 have their gates connected so that the source of MOSFET M2 is at $V_{IN}$, assuming equal threshold voltages. This subtracts $V_{IN}$ from $V_{SW}$. Since the converter adjusts the duty cycle to keep $V_{FB}$ matched to $V_{REF}$, the current through the resistor $R_{P2}$ must be controlled, by adjusting $V_{SW}$, to produce $V_{REF}$. The user selects the resistor $R_{P1}$ needed to scale $V_{FB}$ to generate the desired output voltage and connects the resistor $R_{P1}$ to a terminal of the package housing the converter control circuit 14. $R_{P2}$ may be 10K ohms and formed on the same chip as the converter control circuit 14.

FIG. 5 illustrates a prior art circuit within the output voltage sense circuit 16 of FIG. 3 that scales down the voltage $V_B$ with resistors $R_{B1}$ and $R_{B2}$. The $V_{FB}$ voltage can be expressed as $$V_{FB} = (V_{OUT} + V_F(T)) \cdot \frac{N_B}{N_S} \cdot \frac{R_{B2}}{R_{B1} + R_{B2}}$$

Since $V_F(T)$ in the various equations varies with temperature, and $V_{OUT}$ is directly set by $V_{FB}$, $V_{OUT}$ slopes upward with temperature, as shown in FIG. 6. Thus, $V_{OUT}$ has a positive temperature coefficient. When the various components are set at room temperature, $V_{OUT}$ is only accurate at room temperature. In some environments, $V_{OUT}$ varies as much as 300 mV during the operation of the converter due to temperature changes. This is very significant when the nominal $V_{OUT}$ is 5 V or 3.3 V.

It is known to add a temperature-dependent offset voltage to $V_{FB}$ to compensate for the change in $V_F(T)$ of the diode D.

FIGS. 7 and 8 illustrate prior art temperature compensation circuits added to the circuits of FIGS. 4 and 5, respectively. A conventional bandgap voltage generator provides a stable reference voltage $V_{REF}$ to the base of the bipolar transistor 28. The $V_{BE}$ of the transistor 28 has a negative temperature coefficient of about −2 mV/K. The voltage at the emitter of the transistor 28 is across the temperature compensation resistor $R_{TC}$, which is an external (off-chip) resistor selected by the user. The current through the transistor 28 and through the MOSFET M4 is thus set by the value of $R_{TC}$ and the changing $V_{BE}$ with temperature. MOSFET M3 is connected as a current mirror and adds a variable current $I_{TC}$ to the $V_{FB}$ node. The negative temperature coefficient of $V_F(T)$ is offset by the positive temperature coefficient of the current $I_{TC}$.

The main problem with the temperature compensation circuits of FIGS. 7 and 8 is that the user first selects $R_{P1}$ to generate the desired $V_{OUT}$ at room temperature, then the user heats up the converter to determine the slope of $V_{OUT}$ vs. temperature. Then the user selects $R_{TC}$ to offset the $V_{OUT}$ slope (i.e., makes it independent of temperature). However, since the $I_{TC}$ current is always applied as a bias current to the $V_{FB}$ node, the selection of $R_{TC}$ changes $V_{FB}$, even at room temperature, requiring the user to select a different $R_{P1}$ to achieve the desired $V_{OUT}$. This results in the need to tweak $R_{TC}$ again. The more iterations performed, the more optimal the selection of $R_{P1}$ and $R_{TC}$. This is a tedious process that still results in non-optimized $R_{P1}$ and $R_{TC}$ values. Once the user has settled on $R_{P1}$ and $R_{TC}$ values, the user may set the final circuit design for production.

What is needed is a temperature compensation technique for an isolated flyback converter, using primary side sensing and an output diode, which does not require an iterative process for selecting an optimal value scaling resistor for $V_{OUT}$ and an optimal value temperature compensation resistor for compensating $V_{OUT}$.

SUMMARY

A temperature compensation technique for an isolated flyback converter using primary side sensing and an output diode is disclosed. A voltage source generating a proportional-to-absolute temperature voltage $V_{PTAT}$ is connected to the $V_{FB}$ node of a feedback loop in the converter via a temperature compensation resistor $R_{TC}$. $V_{PTAT}$ is selected to equal a reference voltage $V_{REF}$ at an initial calibration temperature, such as room temperature. The user selects a scaling resistor in the feedback loop of the converter at room temperature so that, when the desired $V_{OUT}$ is achieved, $V_{FB}$ equals $V_{REF}$. Since the converter controls $V_{FB}$ to be equal to $V_{REF}$ during operation at room temperature, there is no current through the resistor $R_{TC}$ at the time that the user selects the scaling resistor. Therefore, the temperature compensation circuit has no effect on the converter at room temperature.

After the scaling resistor is set, the temperature of the converter is raised to determine the slope of $V_{OUT}$ as $V_{OUT}$ rises with temperature. The optimal value of resistor $R_{TC}$ is then selected as the $R_{TC}$ value that offsets the slope of $V_{OUT}$. This may be done using a potentiometer. Alternatively, if the diode drop vs. temperature of the output diode is already known, the proper value of $R_{TC}$ may be determined by equations without raising the temperature of the converter. The selection of $R_{TC}$ does not affect $V_{OUT}$ at room temperature, so there is no need to tweak the scaling resistor after $R_{TC}$ is selected. Accordingly, optimal values of the scaling resistor and the temperature compensation resistor $R_{TC}$ may be selected without an iterative process, greatly easing the user's task and improving performance of the converter with temperature.

Various techniques of forming the $V_{PTAT}$ voltage source are described.

The flyback converter and scaling circuits may be conventional.

BRIEF DESCRIPTION OF THE DRAWINGS

FIG. 3 illustrates a prior art flyback converter that senses the voltage at a node of a third winding for providing a feedback voltage.

FIG. 4 illustrates a prior art circuit for subtracting $V_{IN}$ from $V_{SW}$ and scaling the feedback voltage, for use with the converter of FIG. 1.

FIG. 5 illustrates a prior art circuit for scaling the feedback voltage, for use with the converter of FIG. 3.

FIG. 6 illustrates how the converter output voltage $V_{OUT}$ slopes upward with temperature without temperature compensation.

FIG. 7 illustrates a prior art temperature compensation circuit for use with the circuit of FIG. 4.

FIG. 8 illustrates a prior art temperature compensation circuit for use with the circuit of FIG. 5.

FIG. 9 illustrates a temperature compensation circuit, in accordance with one embodiment of the invention, connected to the circuit of FIG. 4, that allows for the selection of an optimal scaling resistor and an optimal temperature compensation resistor without using an iterative process.

FIG. 10 illustrates the effect on $V_{OUT}$ with the selection of various TC resistor values.

FIG. 11 illustrates a temperature compensation circuit, in accordance with one embodiment of the invention, connected to the circuit of FIG. 5, that allows for the selection of an optimal scaling resistor and an optimal temperature compensation (TC) resistor without using an iterative process.

FIG. 12 illustrates a temperature compensation circuit, connected to the circuit of FIG. 4, for providing a proportional-to-absolute temperature voltage $V_{PTAT}$ at the TC resistor that is equal to $V_{REF}$ at an initial calibration temperature, such as room temperature.

Elements that are the same or equivalent are labeled with the same numeral.

DETAILED DESCRIPTION

Figure 1:
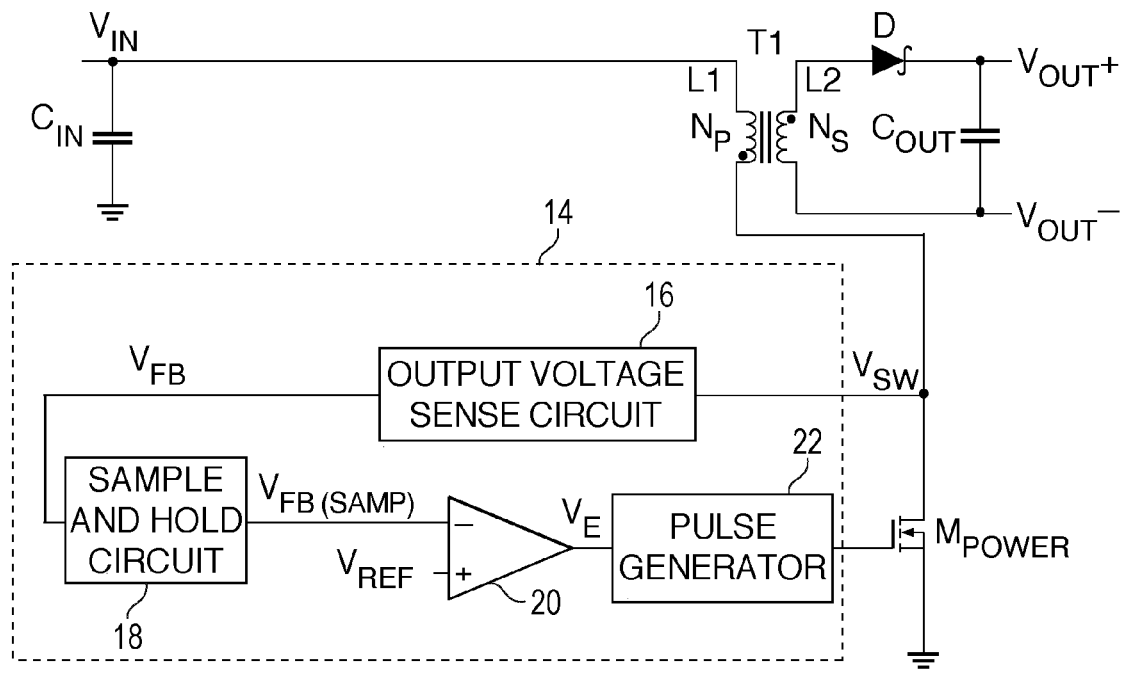
FIG. 1 illustrates a prior art flyback converter that senses the voltage $V_{SW}$ at a node of the power switch for providing a feedback voltage.
Figure 2:
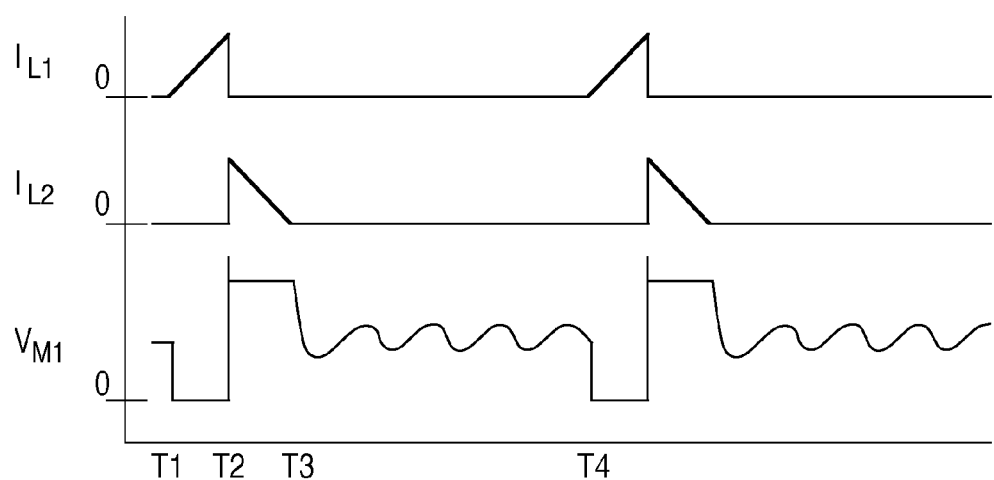
FIG. 2 illustrates the currents through the windings of the transformer in FIG. 1 as well as the voltage across the power switch at a particular duty cycle.

In the various examples, the invention is shown being used in conjunction with the various prior art circuits of FIGS. 1 and 3-5. However, the invention may be used in conjunction with virtually every type of feedback circuit in an isolated flyback converter using primary side sensing.

FIG. 9 illustrates a temperature compensation circuit 30 connected to the $V_{FB}$ node of the circuit of FIG. 4. A voltage source 32 generates a voltage that is proportional to temperature. Such a voltage is referred to as a proportional-to-absolute temperature voltage $V_{PTAT}$. The voltage source 32 is connected via a temperature compensation (TC) resistor $R_{TC}$ to the $V_{FB}$ node 34 in a feedback loop of an isolated flyback converter using primary side sensing. The converter may be, for example, either of the converters of FIG. 1 or FIG. 3, and the temperature compensation circuit 30 may be connected to an input of the error amplifier 20 or other differential amplifier that compares the $V_{FB}$ to a reference voltage $V_{REF}$ in order to adjust the duty cycle of a power switch to cause $V_{FB}$ to match $V_{REF}$.

The resistor $R_{TC}$ is typically external to a chip containing the control circuit 14 (FIG. 1) and is connected to a pin of the IC package. The user selects the proper resistor $R_{TC}$ based on the particular components used in the converter.

The invention of FIG. 9 will be discussed with reference to the flowchart of FIG. 15.

Figure 15:
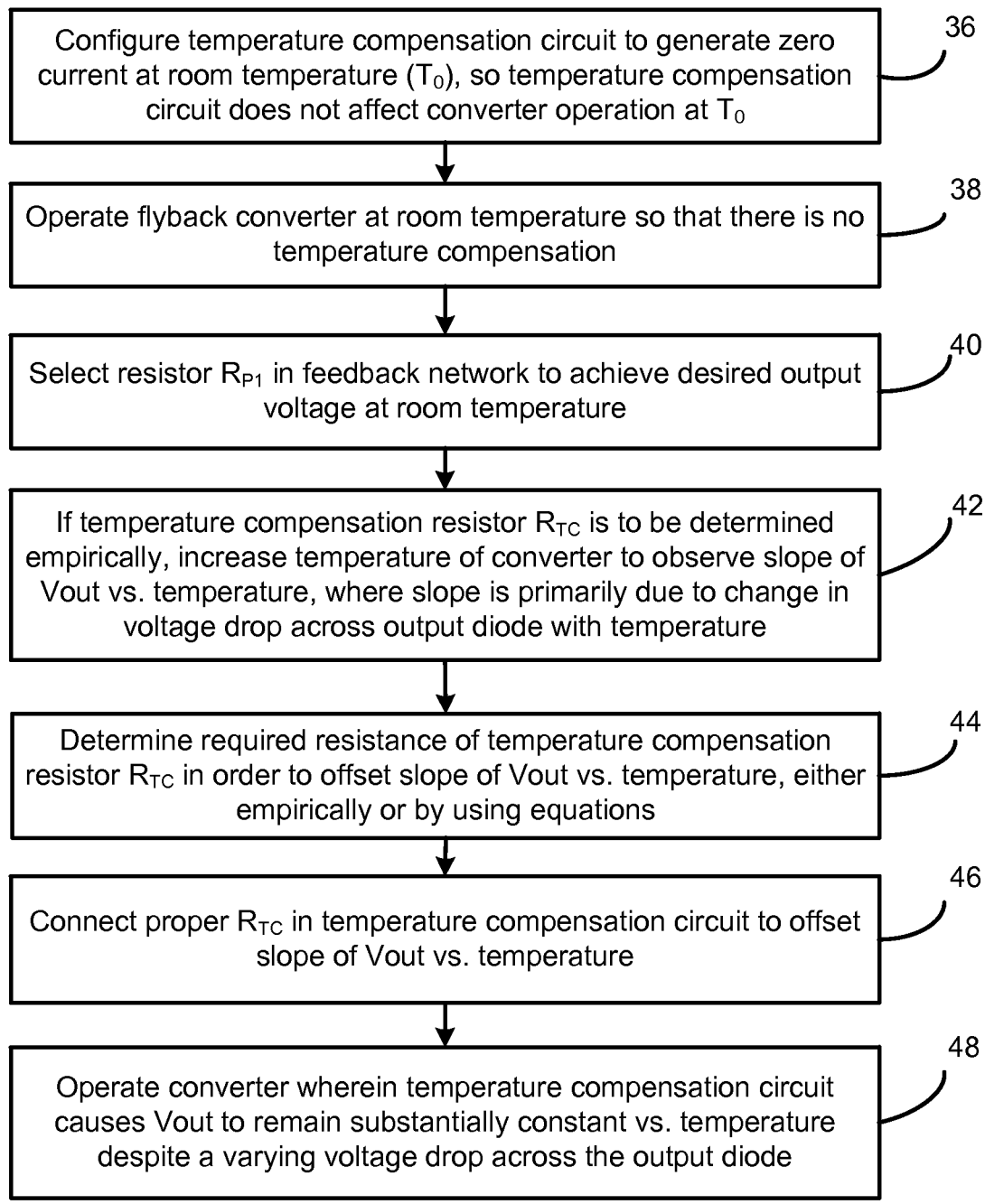
FIG. 15 is a flowchart identifying various steps performed during one embodiment of the invention.

In step 36 of FIG. 15, the TC circuit 30 is configured to generate zero current (or substantially zero current) through the resistor $R_{TC}$ at room temperature, assuming the initial scaling is performed at room temperature for setting $V_{OUT}$. Since the feedback loop causes the converter to always match $V_{FB}$ to $V_{REF}$ (shown in FIG. 1) at the input to the error amplifier 20, $V_{PTAT}$ is set to be $V_{REF}$ at room temperature. Accordingly, since the same voltage is applied to both sides of the resistor $R_{TC}$, there will be no current through $R_{TC}$, and the setting of the scaling resistor in the feedback loop will be independent of the TC circuit 30.

In step 38 of FIG. 15, the converter is operated at room temperature. At this temperature, the TC circuit 30 has no effect on $V_{OUT}$.

In step 40, the scaling resistor $R_{P1}$ is selected by the user to cause $V_{FB}$ to equal $V_{REF}$ when $V_{OUT}$ is at the desired value, such as 5 V. The selection of the scaling resistor $R_{B1}$ may use empirical methods for the highest accuracy. Therefore, the scaling resistor $R_{P1}$ is set to its optimal value in only one step. The scaling resistor $R_{P1}$ is external to the converter control chip and connected to a pin of the IC package. The scaling resistor may be any resistive element in any type of feedback loop, such as any resistor in a resistor divider circuit. The scaling resistor may even be an adjustable resistance on the same chip as the control circuit 14. In another embodiment, either or both of resistors $R_{P1}$ and $R_{P2}$ may be adjusted to achieve the desired $V_{OUT}$. The ratio of $R_{P1}$ and $R_{P2}$ is set to achieve $V_{OUT}$ as follows:

$$V_{OUT} = V_{REF} \cdot \frac{N_S}{N_P} \cdot \frac{R_{P1}}{R_{P2}} - V_F(T_0)$$

As seen, the TC resistor $R_{TC}$ plays no part in the setting of $V_{OUT}$ at room temperature ($T_0$).

In step 42, if the optimal value of $R_{TC}$ is to be determined empirically, $V_{OUT}$ is monitored while the temperature of the converter is increased to determine $V_{OUT}$ vs. temperature. $V_{OUT}$ will increase with temperature due to the voltage drop across the output diode decreasing with temperature. In other words, $V_{SW}$ is no longer representing the desired $V_{OUT}$ level while the current through the resistor $R_{P2}$ is generating a $V_{FB}$ equal to $V_{REF}$ (FIG. 1). What is needed, therefore, is for the TC circuit 30 to add some current through resistor $R_{P2}$ to cause $V_{FB}$ to equal $V_{REF}$ and lower $V_{SW}$ (and $V_{OUT}$) to the desired level.

The $V_{PTAT}$ generated by the voltage source 32 increases with temperature and thus increases a current through $R_{TC}$ with an increase in temperature. The amount of the current increase is proportional to the value of $R_{TC}$. The value of $R_{TC}$ may be adjusted during the ramping of the temperature, such as with a potentiometer, to offset the slope of $V_{OUT}$. Alternatively, instead of determining $R_{TC}$ empirically, the proper $R_{TC}$ value may be determined through calculations if the diode drop vs. temperature of the output diode D is already known. In such a case, the converter does not have to be heated.

In step 44, the desired value of the TC resistor $R_{TC}$ to offset the slope of $V_{OUT}$ is obtained. The proper $R_{TC}$ value may be calculated from the following equation if all other values are known:

$$\frac{V_{REF}}{T_0} \cdot \frac{N_S}{N_P} \cdot \frac{R_{P1}}{R_{TC}} = -\Delta V_F(T)$$

where $\Delta V_F(T)$ is the negative temperature coefficient of $V_F(T)$, i.e., the difference between the forward voltage drop of diode D at temperature $T_0$ and at a raised temperature T divided by the temperature difference.

FIG. 10 illustrates $V_{OUT}$ vs. temperature without any temperature compensation (solid line) and also with the effects of the TC circuit 30 (dashed lines). The effects of selecting too high an $R_{TC}$ value, too low an $R_{TC}$ value, and an optimal $R_{TC}$ value are shown.

In step 46, the optimal TC resistor $R_{TC}$ is connected to the appropriate pin of the IC package containing the control circuit 14 and the TC circuit 30 to offset the slope of $V_{OUT}$ vs. temperature. The effect of the TC circuit 30 does not change $V_{OUT}$ at the calibration temperature $T_0$, so the scaling resistor $R_{P1}$ remains optimal.

In step 48, the converter may be operated over a range of temperatures while $V_{OUT}$ remains substantially stable despite a varying voltage drop across the output diode D.

FIG. 11 illustrates the TC circuit 30 connected to the circuit of FIG. 5 for a converter (FIG. 3) using a third (or bias) winding for primary side sensing. The process for selecting $R_{B1}$ and $R_{TC}$ are similar to that described with respect to FIGS. 9 and 15.

First the scaling resistor $R_{B1}$ is selected by the user for setting $V_{OUT}$ at room temperature as follows:

$$V_{OUT} = V_{REF} \cdot \frac{N_S}{N_B} \cdot \frac{R_{B1} + R_{B2}}{R_{B2}} - V_F(T_0)$$

The selection of the optimal $R_{B1}$ is independent of the TC circuit 30 since the TC circuit 30 generates zero current through the TC resistor $R_{TC}$ at room temperature. The selection of the scaling resistor $R_{B1}$ may use empirical methods for the highest accuracy. The user then connects the selected resistor $R_{B1}$ to the appropriate pin of the IC package containing the converter control circuit and the TC circuit 30.

The TC resistor $R_{TC}$ value may then selected as follows or through empirical analysis:

$$\frac{V_{REF}}{T_0} \cdot \frac{N_S}{N_B} \cdot \frac{R_{B1}}{R_{TC}} = -\Delta V_F(T)$$

Figure 13:
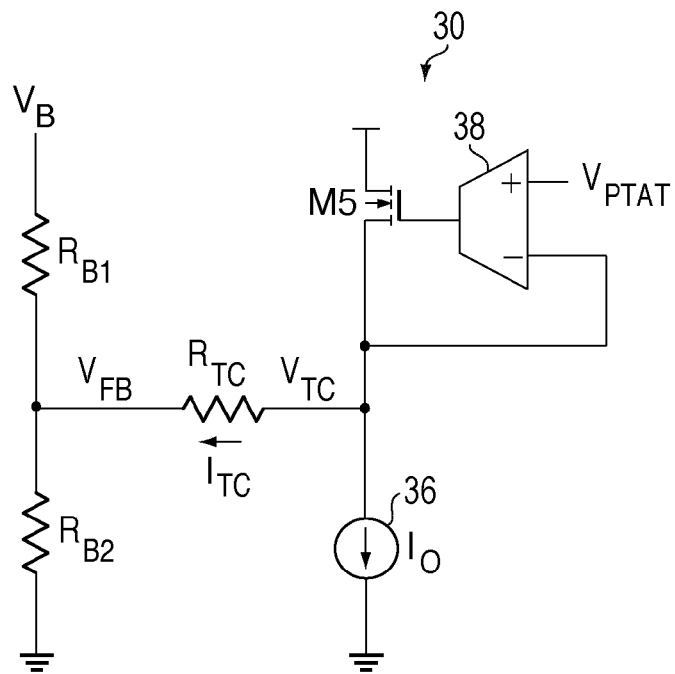
FIG. 13 illustrates a temperature compensation circuit, connected to the circuit of FIG. 5, for providing a proportional-to-absolute temperature voltage $V_{PTAT}$ at the TC resistor that is equal to $V_{REF}$ at an initial calibration temperature, such as room temperature.

FIGS. 12 and 13 illustrate one embodiment of the temperature compensation circuit 30, connected to the circuits of FIGS. 4 and 5, respectively, for providing a proportional-to-absolute temperature voltage $V_{PTAT}$ at the TC resistor $R_{TC}$ that is equal to $V_{REF}$ at an initial calibration temperature, such as room temperature. A feedback loop consisting of the high gain differential amplifier 38 and MOSFET M5 causes the voltage at the inverting input of the amplifier 38 to be substantially equal to $V_{PTAT}$ applied to the non-inverting input of the amplifier 38. A current source 36 draws a relatively low fixed current $I_0$ through the MOSFET M5 for proper operation of the feedback loop. Thus, the voltage applied to the $R_{TC}$ node will be $V_{PTAT}$.

Figure 14:
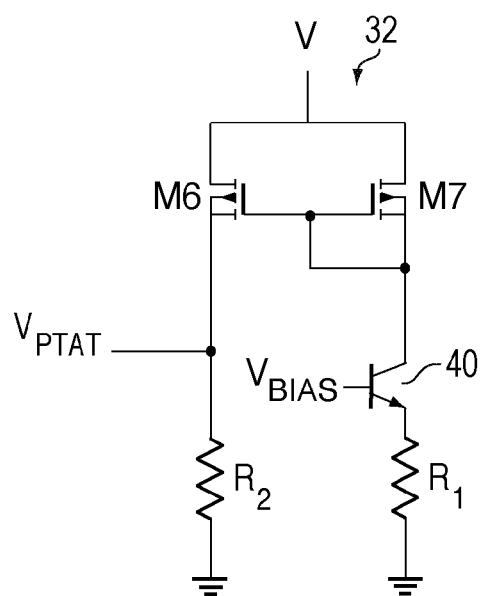
FIG. 14 illustrates a voltage source for generating a proportional-to-absolute temperature voltage $V_{PTAT}$ that is equal to $V_{REF}$ at an initial calibration temperature, such as room temperature.

FIG. 14 illustrates a suitable voltage source 32 for generating a proportional-to-absolute temperature voltage $V_{PTAT}$ that is equal to $V_{REF}$ at an initial calibration temperature, such as room temperature. A fixed $V_{BIAS}$ voltage is applied to the base of the bipolar transistor 40, which draws a current through the resistor $R_1$. Since the $V_{BE}$ of the transistor 40 is related to the temperature (same temperature as the output diode D), and the current through resistor $R_1$ equals $(V_{BIAS} - V_{BE})/R_1$, the current is directly related to the temperature. The output diode D and the transistor 40 are preferably thermally coupled, such as being in the same chip, so that the base-emitter diode temperature is approximately the same as the output diode temperature. In a preferred embodiment, the entire voltage source 32 will be on the same IC chip as the control circuit 14 (FIG. 1) and the output diode D for good thermal coupling between the transistor 40 (FIG. 14) and the output diode D.

The current through the resistor $R_1$ is mirrored by the configuration of MOSFETs M6 and M7, and the current flows through resistor $R_2$. The values of either $R_1$ or $R_2$, or both, are selected so that $V_{PTAT}$ equals $V_{REF}$ (FIG. 1) at room temperature (or other calibration temperature of the converter). The value of $V_{PTAT}$ rises with temperature proportional to the $V_{BE}$ drop of the transistor 40.

Many other ways to generate $V_{PTAT}$ are also envisioned.

Those skilled in the art may design various other circuits to implement the temperature compensation circuit 30 of FIG. 9 without undue experimentation and using conventional circuit techniques. All such circuits are envisioned.

While particular embodiments of the present invention have been shown and described, it will be obvious to those skilled in the art that changes and modifications may be made without departing from this invention in its broader aspects. The appended claims are to encompass within their scope all such changes and modifications as fall within the true spirit and scope of this invention.

What is claimed is:

1. A flyback converter having temperature compensation, the converter comprising:
   a transformer having a primary winding and a secondary winding, the primary winding being part of a primary side of the converter, and the secondary winding being part of a secondary side of the converter, wherein the primary side is isolated from the secondary side such that the converter is an isolated converter;
   a power switch coupled to the primary winding, wherein a duty cycle of the power switch controls an output voltage of the converter;
   a primary side sensing circuit on the primary side and an output diode on the secondary side, the output diode having a variable voltage drop related to its temperature, the primary side sensing circuit comprising an output voltage sense circuit sensing a first voltage generated on the primary side of the transformer when the power switch is off and outputting a feedback voltage $V_{FB}$;
   the converter generating the feedback voltage $V_{FB}$ in a feedback loop that is compared to a fixed reference voltage $V_{REF}$ for setting a duty cycle of the power switch for generating a regulated output voltage $V_{OUT}$, wherein the feedback loop causes $V_{FB}$ to substantially equal $V_{REF}$, $V_{FB}$ being scaled by a scaling resistance, the converter comprising a temperature compensation circuit for at least partially offsetting a rise in $V_{OUT}$ with temperature due to the variable voltage drop of the diode, the temperature compensation circuit comprising:
      a voltage source configured to generate a proportional-to-absolute-temperature voltage $V_{PTAT}$, wherein $V_{PTAT}$ is at substantially $V_{REF}$ at a calibration temperature $T_0$ and rises as a temperature exceeds $T_0$; and
      a temperature compensation resistance $R_{TC}$ coupled between the voltage source and a $V_{FB}$ node of the converter while the converter is operating, wherein substantially no current flows through $R_{TC}$ at $T_0$ due to $V_{FB}$ and $V_{PTAT}$ both being at substantially $V_{REF}$ at $T_0$, and wherein the temperature compensation circuit generates a compensation current through $R_{TC}$ at temperatures above $T_0$ to lower a duty cycle of the power switch and, therefore, lower $V_{OUT}$ at temperatures above $T_0$ to at least partially offset the rise in $V_{OUT}$ with temperature.

2. The converter of claim 1 further comprising the scaling resistance set for establishing a desired $V_{OUT}$ at $T_0$, such that when $V_{FB}$ equals $V_{REF}$ at $T_0$, $V_{OUT}$ is at a desired level, wherein a value of $R_{TC}$ does not affect a selection of the scaling resistance.

3. The converter of claim 1 wherein the feedback loop comprises the scaling resistance in a voltage divider, wherein the $V_{FB}$ node is a node in the voltage divider.

4. The converter of claim 1 wherein the voltage source comprises:
 a fixed bias voltage coupled to a base of a first transistor for generating a base-emitter voltage drop that has a negative temperature coefficient, the first transistor conducting a transistor current having a positive temperature coefficient; and
 a current mirror coupled to the first transistor for generating a mirrored current corresponding to the transistor current having the positive temperature coefficient, the mirrored current being conducted through a resistive element for generating the voltage $V_{PTAT}$.

5. The converter of claim 1 wherein the voltage source comprises:
 a feedback circuit receiving the voltage $V_{PTAT}$ at a first input of a differential amplifier, the feedback circuit causing the voltage $V_{PTAT}$ to be generated at a second input of the differential amplifier, wherein the $V_{FB}$ node is coupled to the second input of the differential amplifier.

6. The converter of claim 1 wherein the voltage source is thermally coupled to the output diode.

7. The converter of claim 1 wherein the voltage source is thermally coupled to the output diode by being on a same integrated circuit chip.

8. The converter of claim 1 wherein the output voltage sense circuit further comprises:
 a voltage detector coupled to a node of the primary winding for detecting a primary winding voltage when the power switch is off, wherein the feedback voltage $V_{FB}$ is derived from the primary winding voltage.

9. The converter of claim 1 wherein the converter further comprises:
 the transformer having a third winding; and
 wherein the output voltage sense circuit further comprises a voltage detector coupled to a node of the third winding for detecting a third winding voltage when the power switch is off, wherein the feedback voltage $V_{FB}$ is derived from the third winding voltage.

10. A method for temperature-compensating a flyback converter, the converter having a transformer having a primary winding and a secondary winding, the primary winding being part of a primary side of the converter, and the secondary winding being part of a secondary side of the converter, wherein the primary side is isolated from the secondary side such that the converter is an isolated converter, the converter having a power switch coupled to the primary winding, wherein a duty cycle of the power switch controls an output voltage of the converter, the converter having a primary side sensing circuit on the primary side and an output diode on the secondary side, the output diode having a variable voltage drop related to its temperature, the primary side sensing circuit comprising an output voltage sense circuit sensing a first voltage generated on the primary side of the transformer when the power switch is off and outputting a feedback voltage $V_{FB}$, the feedback voltage $V_{FB}$ being in a feedback loop that is compared to a fixed reference voltage $V_{REF}$ for setting a duty cycle of the power switch for generating a regulated output voltage $V_{OUT}$, wherein the feedback loop causes $V_{FB}$ to substantially equal $V_{REF}$, $V_{FB}$ being scaled by a scaling resistance, the converter comprising a temperature compensation circuit for at least partially offsetting a rise in $V_{OUT}$ with temperature due to the variable voltage drop of the diode, the method comprising:
 operating the converter at an initial calibration temperature $T_0$;
 selecting a value of the scaling resistance at $T_0$ so that $V_{OUT}$ is a desired value when $V_{FB}$ equals $V_{REF}$, $V_{FB}$ being generated at a $V_{FB}$ node;
 providing a voltage source configured to generate a proportional-to-absolute-temperature voltage $V_{PTAT}$, wherein $V_{PTAT}$ is at substantially $V_{REF}$ at $T_0$ and rises as a temperature exceeds $T_0$; and
 selecting a temperature compensation resistance $R_{TC}$ coupled between the voltage source and the $V_{FB}$ node, wherein substantially no current flows through $R_{TC}$ at $T_0$ due to $V_{FB}$ and $V_{PTAT}$ both being at substantially $V_{REF}$ at $T_0$, such that a value of $R_{TC}$ does not substantially affect $V_{OUT}$ at $T_0$,
 wherein a compensation current flows through $R_{TC}$ at temperatures above $T_0$ to lower a duty cycle of the power switch and, therefore, lower $V_{OUT}$ at temperatures above $T_0$ to at least partially offset the rise in $V_{OUT}$ with temperature.

11. The method of claim 10 further comprising heating at least the output diode and voltage source above $T_0$ for selecting a value of $R_{TC}$ needed to offset the rise in $V_{OUT}$ with temperature due to the variable voltage drop of the diode.

12. The method of claim 10 wherein the feedback loop comprises the scaling resistance in a voltage divider, wherein the $V_{FB}$ node is a node in the voltage divider.

13. The method of claim 10 wherein the voltage source comprises:
 a fixed bias voltage coupled to a base of a first transistor for generating a base-emitter voltage drop that has a negative temperature coefficient, the first transistor conducting a transistor current having a positive temperature coefficient; and
 a current mirror coupled to the first transistor for generating a mirrored current corresponding to the transistor current having the positive temperature coefficient, the mirrored current being conducted through a resistive element for generating the voltage $V_{PTAT}$.

14. The method of claim 10 wherein the voltage source comprises:
 a feedback circuit receiving the voltage $V_{PTAT}$ at a first input of a differential amplifier, the feedback circuit causing the voltage $V_{PTAT}$ to be generated at a second input of the differential amplifier, wherein the $V_{FB}$ node is coupled to the second input of the differential amplifier.

15. The method of claim 10 wherein the voltage source is thermally coupled to the output diode.

16. The method of claim 10 wherein the voltage source is thermally coupled to the output diode by being on a same integrated circuit chip.

17. The method of claim 10 wherein the output voltage sense circuit further comprises a voltage detector coupled to a node of the primary winding, the method further comprising:
- detecting a primary winding voltage by the voltage detector when the power switch is off; and
- deriving the feedback voltage $V_{FB}$ from the primary winding voltage.

18. The method of claim 10 wherein the transformer further comprises a third winding, the method further comprising:
- detecting a third winding voltage at a node of the third winding when the power switch is off; and
- deriving the feedback voltage $V_{FB}$ from the third winding voltage.

19. The method of claim 10 wherein the initial calibration temperature $T_0$ is room temperature.

\* \* \* \* \*